Feb. 15, 1966  M. COWELL  3,234,691
MULCHING MACHINE
Filed Oct. 22, 1963  4 Sheets-Sheet 1
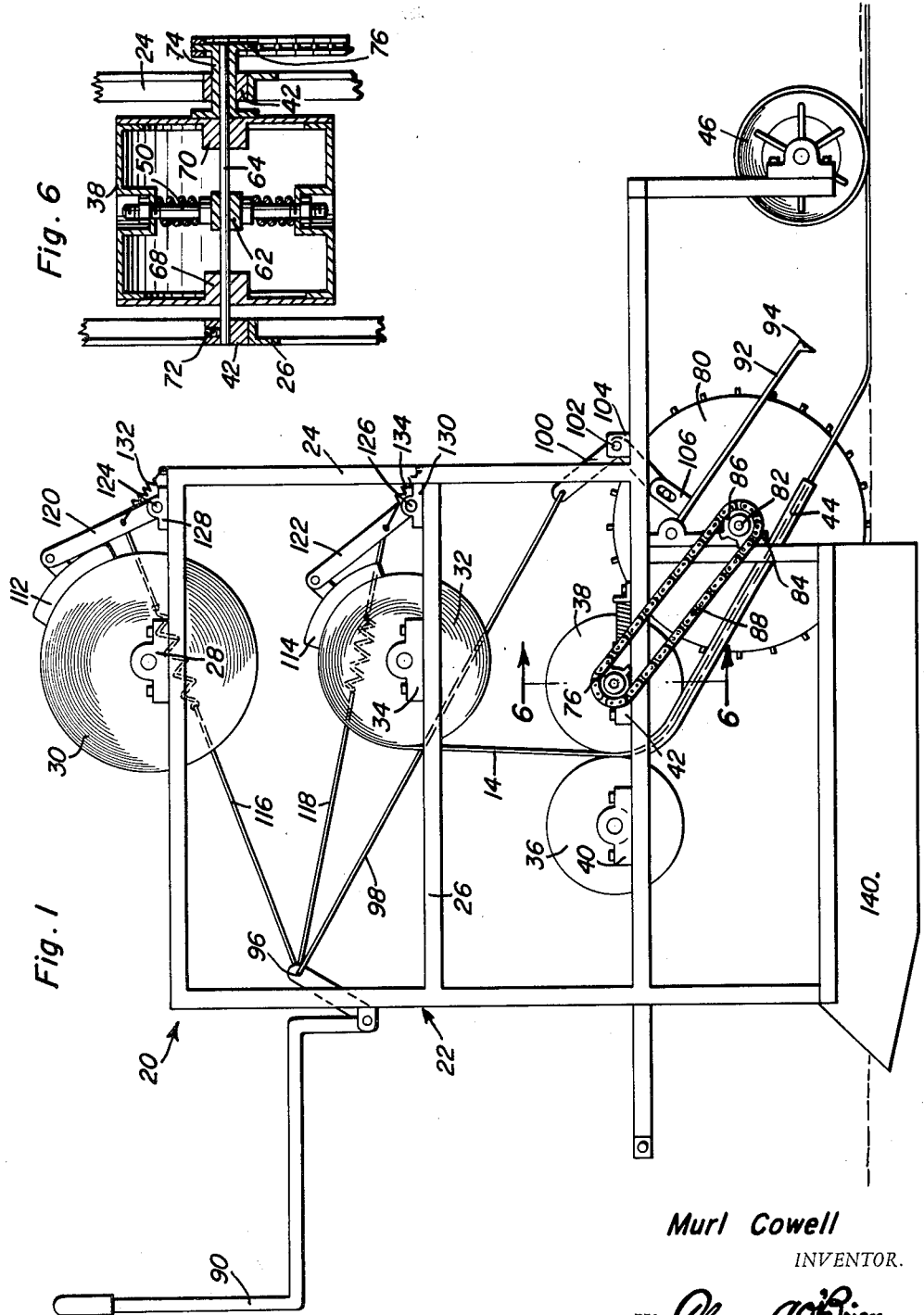
Murl Cowell
INVENTOR.
BY *Clarence A. O'Brien*
and *Harvey B. Jacobson*
Attorneys

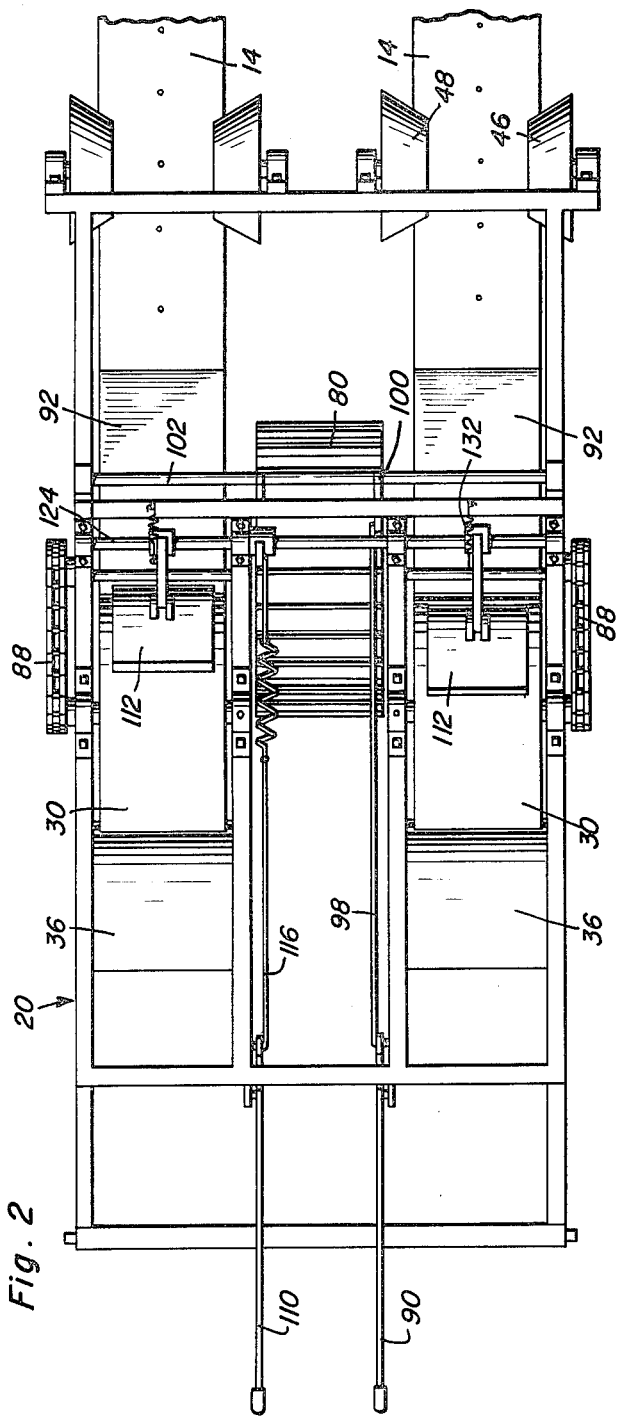

Feb. 15, 1966 M. COWELL 3,234,691
MULCHING MACHINE
Filed Oct. 22, 1963 4 Sheets-Sheet 3
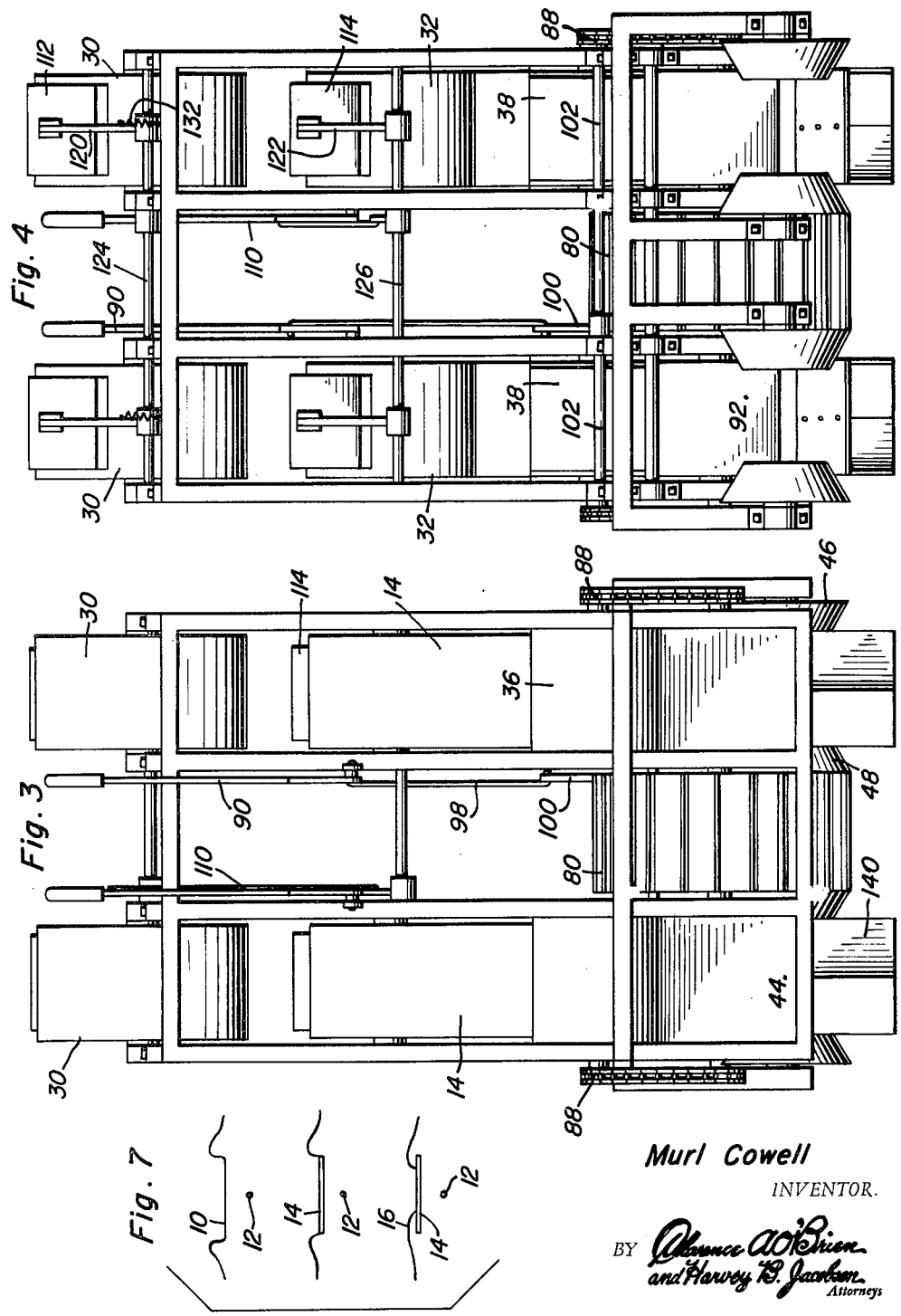
Murl Cowell
INVENTOR.

Murl Cowell
INVENTOR.

United States Patent Office 3,234,691
Patented Feb. 15, 1966

3,234,691
MULCHING MACHINE
Murl Cowell, Durant, Okla.
(2416 N. Western, Oklahoma City, Okla.)
Filed Oct. 22, 1963, Ser. No. 318,003
5 Claims. (Cl. 47—9)

This invention primarily relates to a device for attachment to a planter for laying paper over a furrowed seed bed.

The device of the present invention is specifically adapted to lay paper over a pair of spaced rows of seed beds and punch holes in the paper to let the growing plants come up at desired distances apart. This will not only prevent the ground from drying out by holding moisture at the top of the ground where the moisture is needed to best produce crops, but to prevent weeds from growing in and around these plants.

Accordingly, it is the primary object of this invention to disclose a paper laying machine which may be attached to a conventional seed planter and which will punch holes in the paper at predetermined distances corresponding to the spacing of seeds in the seed bed on which the paper is laid.

Still a further object of this invention resides in the provision in a machine of a bed-shaper for scraping a trough in the earth into which the paper may be laid. The machine further comprises means for partially covering said paper with the same scraped earth in order to firmly hold it in place to prevent its dislocation.

A still further object of this invention resides in a novel power means for driving the paper delivery means used in the present invention as well as controlling the hole punching device. Said power means specifically comprises a traction wheel mounted upon the attachment whereby its rotation may be timed and controlled in relation to the planter to correctly activate the paper delivering and hole punching means.

Yet another object of this invention resides in the novel manner and apparatus used to punch the aforementioned holes in the paper as it is being delivered which comprises a wheel mounting a plurality of radially slidable punches about the circumference thereof each of which is adapted to punch a hole at a predetermined location and in timed relation and which is controlled by stationary cam means mounted within said rotating wheel.

A further object of this invention also comprises the provision of manually operated, adjustable, lever actuated, brake means carried by the device for preventing continued unrolling of paper from the device after the desired amount of paper has been completely laid.

Yet another object of this invention resides in the provision of manually operated, lever actuated, cutter means for severing paper from the device upon a predetermined quantity of paper being deposited in the paper receiving bed.

A final object of this invention specifically resides in its novel arrangement of parts, its ready adaptability to its intended purpose, efficiency in operation and ready commercial feasibility.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view in elevation of the planter attachment comprising the subject matter of the instant invention;

FIGURE 2 is a top plan view of the device shown in FIGURE 1;

FIGURE 3 is an end view in elevation of the device as seen from the left hand end of FIGURE 1;

FIGURE 4 is an end view in elevation of the device as seen from the right hand end of FIGURE 1;

FIGURE 6 is a cross sectional view taken substantially along the plane indicated by the line 6—6 of FIGURE 1;

FIGURE 7 is a schematic representative illustrating three steps in the laying and covering of the paper dispensed by the present device.

Figure 5:
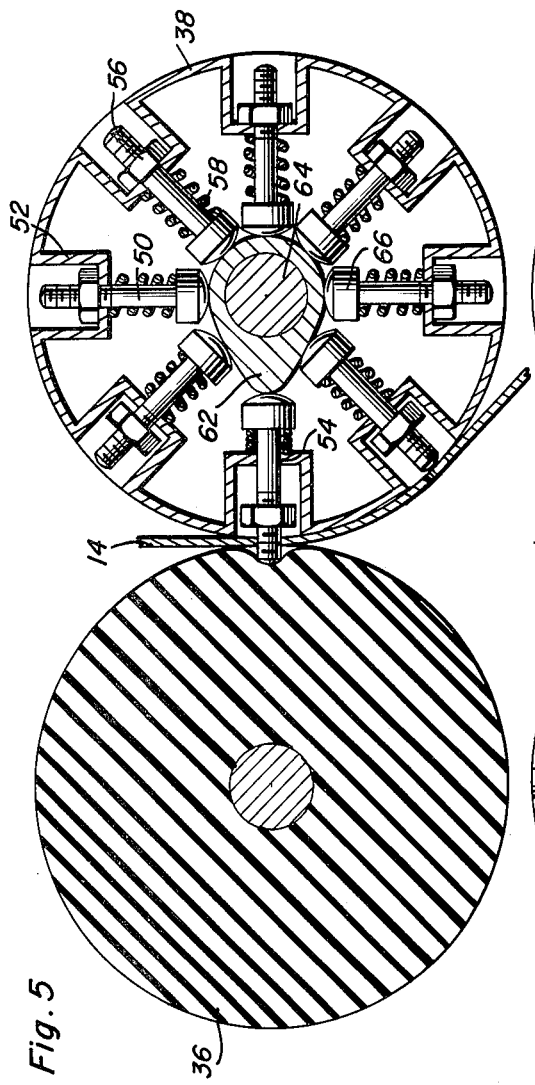
FIGURE 5 is a cross-sectional view through the center of one form of the paper delivering means and hole punching device used in conjunction with the present invention.

Referring now to the drawings in detail, and first particularly to FIGURE 7, it will be seen that the instant machine is adapted to form a shallow trough or bed such as 10 in the earth after a seed such as 12 has been planted in furrowed earth. Once this shallow trough of bed 10 has been formed, a strip of paper 14 is adapted to be laid in said bed or trough and includes a plurality of spaced apertures through which the plant germinated by the seed 12 will extend. However, to complete the procedure, earth such as 16 will be partially disposed along the edges of the strip of paper 14 to firmly hold it in position.

In order to accomplish the specified purpose, the planter attachment generally designated by the numeral 20 may be used. The planter attachment 20 comprises a generally upright frame 22 which comprises a plurality of vertically extending angle irons 24 and a plurality of horizontally extending angle irons 26 welded or otherwise secured together to form the frame 22. As will be apparent from an inspection of FIGURES 2, 3 and 4, the device is adapted to lay paper in two or more spaced rows. However, for the purpose of description, the machine will be described for laying paper in a single row and it is to be understood that the other half of the device is similar in construction.

Rotatably mounted between a pair of upper angle irons 26 within a pair of bearings 28 is a spare paper roll 30. Also mounted upon the frame 22 immediately below the roll 30 is a paper roll 32 journaled between a pair of bearings 34. The paper 14 is adapted to be unrolled from the paper roll 32 and threaded between a pair of contacting wheels 36 and 38, each of which is journaled between a pair of bearings 40 and 42 mounted between a pair of lower horizontal angle iron members 26. The paper 14 is then threaded through a partially arcuate chute 44 which guides the paper to the shallow trough or bed 10. A pair of opposing camming disc wheels 46 and 48 ride along the edges of the shallow bed or trough 10 and are adapted to cam or push earth onto the longitudinal edges of the paper as it is being laid in order to hold it firmly in position within the bed 10.

Referring now specifically to FIGURE 5, as aforementioned, the paper delivery means comprises a pair of wheels 36 and 38 adapted to abut and contact each other along mutually tangential surfaces. The wheel 38 is hollow and readily adapted to be disassembled. Mounted centrally along the circumference thereof a plurality of hole punching bolts such as indicated by the numeral 50. Each one of said bolts is radially slidable with respect to the wheel 38 and are positioned in a plurality of spaced depressions or housings 52 in the wheel circumference. Each one of said housings or depressions includes an aperture 54 through which the bolt shank is adapted to slide and each of the bolts 50 are held in position by means of a nut 56 threaded on the shank adjacent the aperture 54. A coil spring 58 is wound on each of the bolt shanks and normally biases each bolt radially inwardly, until the nut 56 abuts the housing 52 adjacent the aperture 54. A cam 60 mounted on a stationary cam shaft 64 is adapted to make contact with the heads 66 of each of the bolts and push them radially outwardly against the biasing effect of the coil spring 58 as the wheel 38 rotates thereabout toward the abutting mutually tangential surfaces of the wheels 36 and 38. As shown in FIGURE 6, the cam shaft 64 extends through a pair of bearings 68 and 70 in the side plates of the wheel 38 and is rigidly held in one of the bearings 42 by means of a set screw 72 or the like. Attached to one of the side plates of the wheel 38 is a collar or sleeve 74 rotatably mounted in the other of said bearings 42 about an axis defined by the cam shaft 64. Said sleeve 74 carries a sprocket 76 at its outer end to which a suitable drive for rotating the wheel 38 may be attached. It should thus be apparent that upon rotation of the sprocket 76, the wheel 38 will rotate but the cam shaft 64 will remain stationary and fixed. Also, as shown in FIGURE 5, the abutting wheel 36 is made of a flexible resilient material such as rubber which will deflect upon contact with one of the bolts 50 punching a hole through the paper 14. It should also be understood that upon rotation of the wheel 38, the wheel 36 will also rotate due to its frictional contact with the wheel 38. Therefore, the paper 14 threaded between said wheels will be effectively fed into the chute 44 and onto the bed 10.

In order to drive the wheels 36 and 38, power means comprising a large traction wheel 80 is positioned between adjacent rows on which the paper is being laid. As the planter attachment is being pulled along by the planter and tractor combination, the wheel 80 contacting the ground surface is adapted to rotate. This wheel will rotate the shaft 82 to which it is rigidly attached. Said shaft is journaled between a pair of suitable bearings such as 84 on the attachment frame 22 and also has keyed or otherwise rigidly attached thereto a suitable sprocket such as 86. An endless flexible chain 88 is entrained over the sprockets 76 and 86 to form a driving connection therebetween. Hence, upon rotation of the wheel 80, shaft 82, sprocket 86, and flexible endless chain 88, the sprocket 86 will be caused to rotate and turn the wheel 38 which in turn will drive the contact wheel 36. By changing the diameter of the power wheel or the size of the sprockets 76, 86 the rate of delivery of the paper to the bed 10 may be varied in accordance with the seed planting operation.

When the paper 14 has been disposed in a complete row of seeds, a suitable lever 90 mounted upon the frame may be actuated to trip a paper cutter 92 including a serrated or sharp cutting edge 94 to sever the paper positioned within the bed 10 from the machine. This is accomplished through the actuation of a link 96 by the lever 90. A guide wire or rod 98 has one of its ends attached to the link 96 and the other of its ends attached to a bell crank link 100 which is adapted to rotate a shaft 102 pivoted in bearings 104 when acuated. The bell crank 100 has a sliding connection with an upstanding ear 106 carried by the paper cutter 92. Therefore, upon movement of the lever 90, the guide wire 98 will be pulled forward by the link 96, which in turn will cause the bell crank 100 to rotate in a counter-clockwise direction as viewed in FIGURE 1 which in turn will cause the paper cutter 92 to move downwardly due to the camming motion at the sliding connection between the bell crank 100 and the upstanding ear 106 on the cutter.

A second lever 110 is provided on the machine for simultaneously actuating a pair of brake shoes 112 and 114 to contact the paper rolls 30 and 32, respectively, to prevent them from rotating. This, of course, will prevent any further paper from being fed from these rolls. Thus, the lever 110 is connected to a pair of flexible and resilient guide wires or rods 116 and 118 which are in turn connected to a pair of levers 120 and 122 carrying the brake shoes 112 and 114 at their upper ends. The levers 120 and 122 are mounted on a pair of shafts 124 and 126 rotatable in spaced bearing pairs 128 and 130 mounted on the frame means 22. Each of the links 120, 122 is biased by means of a spring 132 and 134 to a position away from the rolls 30, 32. Thus, upon actuation of the lever 110, in a forward direction, the flexible guide wires or rods 116, 118 will be pulled to the left as seen in FIGURE 1, thereby pulling the links 120 and 122 in the same direction against the bias of the spring 132, 134. The brake shoes 112, 114 will be placed into frictional engagement with each of the rolls 30, 32, respectively. Due to the resilient nature of the guide wires or rods 116, 118, the effective length of these rods or wires may be varied to compensate for the various roll diameters. Of couse, it should be apparent, that when old paper from the roll 32 has been used, the spare roll 30 may be put to use in a similar manner without the necessity of repositioning it in the lower position occupied by the roll 32.

To complete the assembly of the machine, the bed shaping tool 140 is suspended from the fame 22 in advance of the paper delivery and positioning means.

To summarize the operation of the device, it will be understood that paper taken from either of the rolls 30, 32 and threaded between the opposing 36, 38, the abutting tangential surfaces thereof. Paper is then threaded through the chute 44 and positioned within the shallow trough or bed 10 cut in advance of the paper being laid by the bed shaping tool 140 suspended from the frame 22. As the paper is being laid, the camming discs 46, 48 cam earth onto the longitudinal edges of the laid paper 14. Further, as the paper travels between the opposing surfaces of the wheels 36, 38, and the wheel 38 rotates, the stationary cam 62 will push one of the bolts 54 radially outwardly to punch a hole in the paper. The distance between the holes punched may be easily varied by only using a requisite number of bolts. When paper has been laid completely in one row, the lever 90 may be actuated to drop the cutter 92 to sever the paper from the device. Also, the lever 110 may be actuated to apply the brake shoes 112, 114 to prevent paper from being unrolled from the rolls 30, 32.

Although only one half of the machine has been described, it should be understood that the other half on the opposite side of the traction wheel 80 operates in an identical manner. For example, the bell crank 100 rotates the shaft 102 on which may be positioned a similar crank as 100 for operation on a similar ear 106 associated with the cutter on the opposite side of the machine. Also, rotation of the shafts 124, 126 will actuate a similar pair of links 120, 122 on the opposite side of the machine. The traction wheel 80 also has an independent drive connection through a similar endless chain 88 to a second pair of opposing wheels 36, 38.

Figure 8:
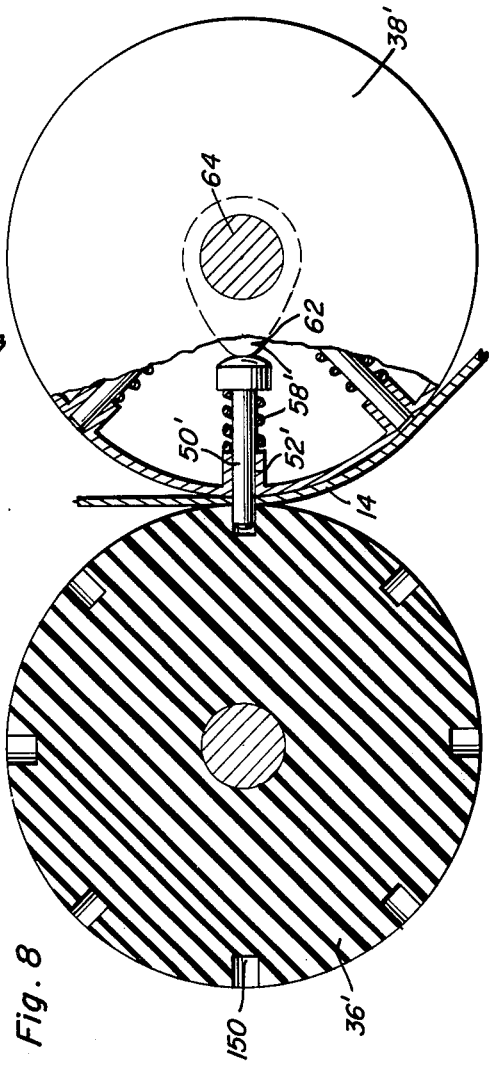
FIGURE 8 is a cross-section view similar to FIGURE 5, but illustrating a slightly modified form of paper delivery means and hole punching device.

Specific reference to FIGURE 8 will disclose a slightly modified form of paper delivery means which can be used in conjunction with the present invention. The operation and construction of the wheels 36' and 38' are identical to the operation of the wheels 36 and 38, except that the wheel 36' comprises apertures 150 for receiving the bolts or pins 50' when they pass through the paper 14. There are eight radial bolts 50' spring biased inwardly by means of coil springs 58' wound on each of the bolt shanks. The bolt 50' operate off the cam 62 in the same manner as the bolts 50 to provide the requisite spaced holes in the paper 14. The bolts 50' have sliding connections through radial projections 52' spaced about the circumference of the wheel 38' and which extend radially inward. One end of each of said projections presents an abutment shoulder for each of the coil springs 58' wound about the bolt 50'.

Due to the reception of the bolts 50 within the apertures 150, a positive driving connection is established between the wheels 36' and 38' whereby the rotation of the wheel 38' will drive the wheel 36'. This will insure the proper dispensation of the paper 14 from the roll 32 as the requisite frictional drive of the paper will be maintained by the rolling contact of both wheels with the paper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A planter attachment for laying paper on a furrowed seed bed comprising frame means including front and rear ends and ground engaging support means for supporting said frame means from a horizontal surface disposed in a horizontal plane in predetermined evelation relative to said surface, bed shaper means depending from said frame means for cutting and shaping a paper receiving bed in the earth above said furrowed seed bed, paper roll means carried by said frame means, paper delivery means rotatably mounted on said frame means for unrolling paper from said paper roll means and delivering the unrolled paper to said paper receiving bed, said paper delivery means including hole punching means for punching holes in predetermined spaced relation in said paper corresponding to the spacing of said seeds in said seed bed as it is unrolled by said paper delivery means, drive means supported from said frame and operatively connected to said paper delivery means for driving the latter, elongated rearwardly and downwardly inclined paper guide means slidably and guidingly receiving said paper after being acted upon by said delivery means, the rear lower end of said paper guide means being positioned in elevation relative to said frame so as to terminate rearwardly a spaced distance above said horizontal plane from which said frame is supported, paper roll brake means mounted on said frame adjacent said paper roll means, knife blade means supported from said frame and operatively connected to said brake means, means connected between said frame and said knife blade means for raising and lowering the latter and for operatively connecting said blade means with said paper roll brake means, and ground engaging disk means supported from said frame means and disposed rearwardly of said knife blade means and including means for camming dirt from the ground over the opposite longitudinal edge portions of the paper being laid by said planter attachment, whereby application of said brake means results in a tensioning of the paper between said hole punching means and said disk means facilitating the cutting of said paper.

2. The combination of claim 1 wherein said power means and said support means include a ground engaging traction wheel drivingly connected to said paper delivery means.

3. The combination of claim 2 wherein said paper delivery means includes a pair of opposing wheels abutting along tangential surfaces, the paper from said paper roll means being threaded between said wheels at said abutting surfaces and said traction wheel being drivingly connected to one of said opposing wheels whereby said paper will be pulled from said paper roll means upon rotation of said traction wheel.

4. The combination of claim 3 wherein said hole punching means includes stationary cam means mounted within one of said opposing wheels, a plurality of spaced, radially slidable paper punches mounted on and housed within said one wheel about the circumference thereof, said cam means sequentially pushing one of said punches radially outwardly of said wheel and through said paper at said abutting surfaces of said opposing wheels upon rotation thereof.

5. The combination of claim 4 wherein the other of said opposing wheels is made from a resilient material to absorb said punch at said abutting surfaces of said wheels.

References Cited by the Examiner
UNITED STATES PATENTS

| | | | |
|---|---|---|---|
| 1,562,353 | 11/1925 | McGuire et al. | 47—9 |
| 1,659,715 | 2/1928 | Baker et al. | 83—347 |
| 2,078,872 | 4/1937 | Pfeiffer | 47—9 |
| 2,083,370 | 6/1937 | Greulich | 83—345 |
| 2,869,284 | 1/1959 | Abernathy et al. | 47—9 |

ABRAHAM G. STONE, *Primary Examiner.*